United States Patent [19]
Logsdon

[11] 3,967,779
[45] July 6, 1976

[54] AIR MIXING VALVE HAVING A THERMAL MOTOR ACTUATOR FOR EFFECTING ADJUSTMENT

[75] Inventor: Hillard Glenn Logsdon, Charlotte, N.C.

[73] Assignee: Aeronca, Inc., Pineville, N.C.

[22] Filed: Sept. 3, 1974

[21] Appl. No.: 502,302

Related U.S. Application Data

[63] Continuation-in-part of Ser. No. 438,570, Feb. 1, 1974.

[52] U.S. Cl. .................................. 236/49; 137/601; 137/607; 236/13; 236/68 R; 251/11
[51] Int. Cl.² .......................................... F24F 13/04
[58] Field of Search ............ 236/13, 49, 68 R, 68 B, 236/68 C; 251/11; 137/601, 607

[56] References Cited
UNITED STATES PATENTS

| | | | |
|---|---|---|---|
| 2,235,023 | 3/1941 | Komroff et al. | 236/68 R UX |
| 2,257,007 | 9/1941 | Harris | 236/49 |
| 2,330,725 | 9/1943 | McGrath | 236/13 |
| 2,331,476 | 10/1943 | Jones | 236/13 X |
| 2,794,598 | 6/1957 | Waterfill | 236/68 R X |
| 3,004,710 | 10/1961 | Couffer, Jr. et al. | 236/68 R X |
| 3,050,601 | 8/1962 | Bohn | 236/68 R UX |
| 3,059,417 | 10/1962 | Sherwood | 251/11 X |
| 3,257,931 | 6/1966 | Lupton | 236/68 C X |
| 3,298,658 | 1/1967 | Alyea | 251/11 |

Primary Examiner—Robert G. Nilson
Attorney, Agent, or Firm—Bell, Seltzer, Park & Gibson

[57] ABSTRACT

A mixing valve for mixing airstreams in an air distributing system including a housing having first and second air inlet passages therein for receiving respective airstreams of different characteristics, valve means cooperating with the first and second inlet passages for adjustably selecting the proportion of air received through the respective passages so as to obtain a mixture of the two airstreams from the mixing valve, and an actuator cooperating with the valve means for effecting adjustment of the same to obtain a desired mixture of the different airstreams from the mixing valve. The actuator includes a thermal motor having an axially movable shaft extending therefrom, a heater cooperating with the thermal motor for applying heat thereto to effect movement of the motor shaft toward an extended axial position, and linkage operably interconnecting the thermal motor and the valve means and being movable in response to axial movement of the motor shaft for effecting adjustment of the valve means.

8 Claims, 5 Drawing Figures

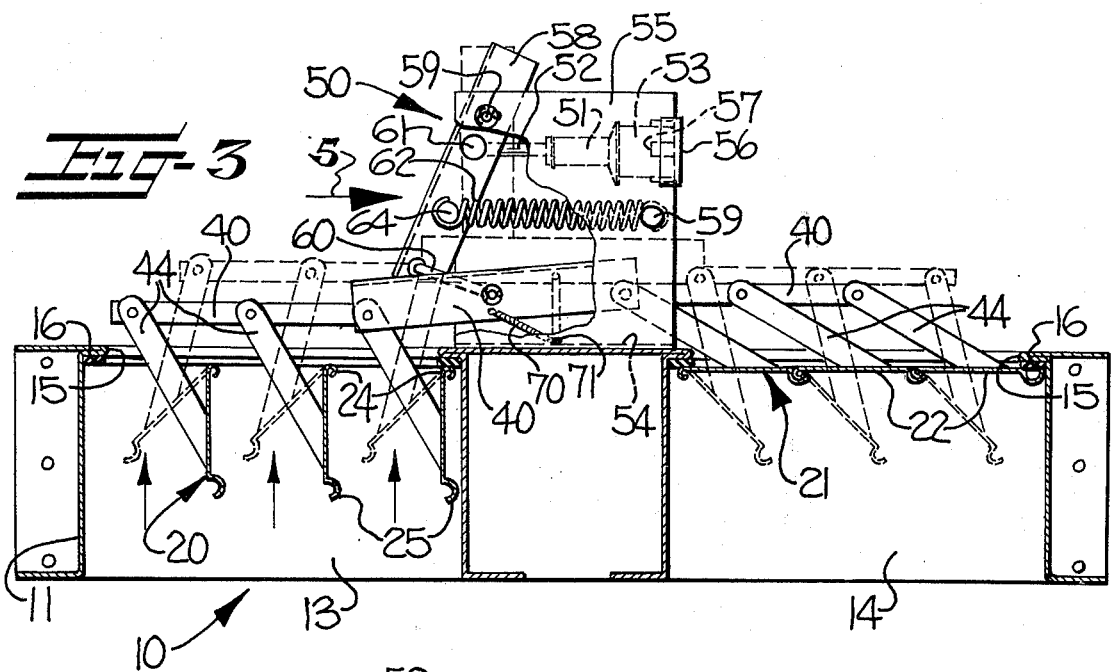
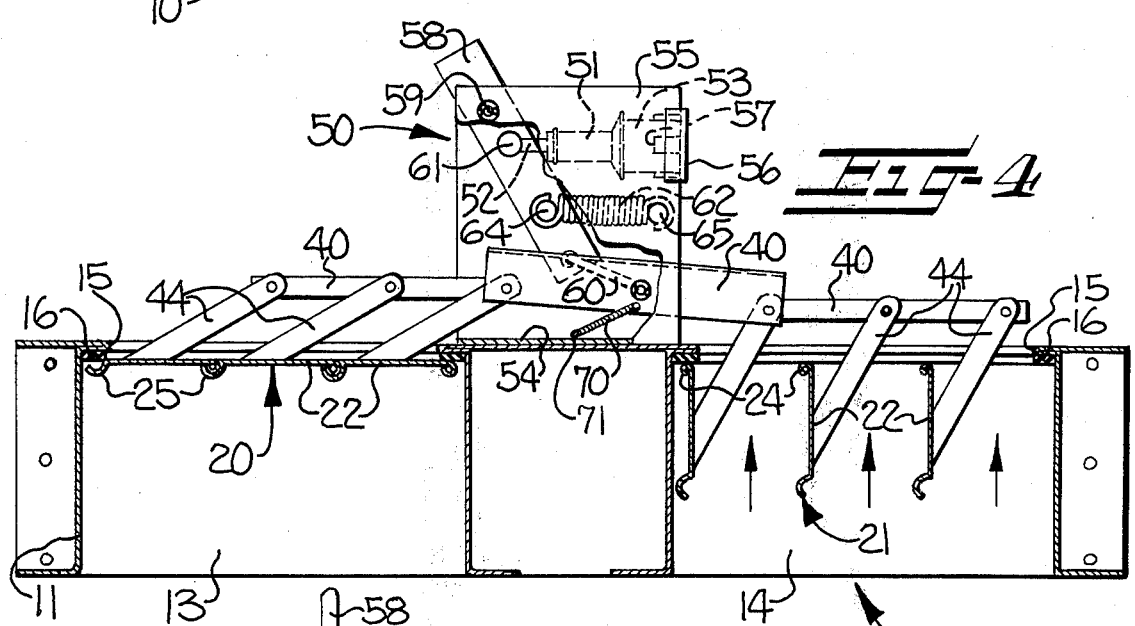
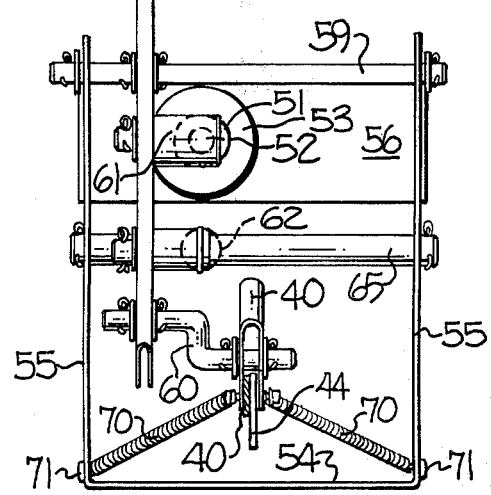

AIR MIXING VALVE HAVING A THERMAL MOTOR ACTUATOR FOR EFFECTING ADJUSTMENT

This application is a continuation-in-part of my commonly assigned copending application Ser. No. 438,570, filed Feb. 1, 1974, and entitled MIXING VALVE FOR AIR DISTRIBUTING SYSTEMS.

This invention relates to air distributing systems, and more particularly to an air mixing valve wherein an improved form of actuator is employed for effecting adjustment thereof.

Various types of air mixing valves have been employed in air distributing systems for obtaining a mixture of airstreams of different characteristics. For example, mixing valves are commonly employed in so-called "dual duct" air conditioning systems for obtaining a blend or mixture of air at a desired temperature from respective warm and cool air supply ducts. Such mixing valves generally employ some type of valve means for controlling the amount of air received from the respective warm and cool ducts and employ an actuator for effecting adjustment of the valve means so that the mixture or blend of air is delivered at a desired temperature.

One form of actuator commonly employed in many air distributing systems for effecting adjustment of mixing valves is the conventional type of pneumatic actuator which uses pressurized air to move a diaphragm or piston to, in turn, move an actuator rod connected to the valve means. However, such pneumatic actuators are bulky, heavy, and relatively expensive. Further, the pneumatic actuators are expensive to install since they require a source of compressed air and require the use of relatively expensive control thermostats and pneumatic control lines associated therewith. While various types of electrically operated actuators have been proposed, none are entirely satisfactory, since those having sufficient power for use with mixing valves are also relatively bulky, heavy and expensive.

With the foregoing in mind, it is an object of this invention to overcome the disadvantages above mentioned by providing a mixing valve employing an actuator of improved design having a thermal motor as the prime mover.

In accordance with the invention, a mixing valve is provided including a housing having first and second air inlet passages therein for receiving respective airstreams of different characteristics and including valve means cooperating with the first and second inlet passages for adjustably selecting the proportion of air received through the respective passages, and also including actuator means cooperating with the valve means for effecting adjustment of the same to obtain a desired mixture of the different airstreams from the mixing valve. The actuator means includes a thermal motor having an axially movable shaft extending therefrom, heating means cooperating with the thermal motor for applying heat thereto to effect movement of the motor shaft toward an extended axial position, and means operatively interconnecting the thermal motor and the valve means and being movable in response to the axial movement of the motor shaft for effecting adjustment of the valve means.

More particularly, the thermal motor and the valve means are interconnected by means which extends from the thermal motor and which preferably also serves to impart a relatively large movement to the valve means upon a relatively small axial movement of the motor shaft. Biasing means is provided for biasing the valve means toward a first predetermined adjusted position, and the thermal motor cooperates with the valve means so as to move the same against the biasing means and toward a second predetermined adjusted position.

In accordance with a preferred form of the invention, the actuator means is employed with a mixing valve of compact construction and wherein the respective flow control valves thereof are arranged so as to provide an intimate intermixture of the respective airstreams. More particularly, the actuator means is preferably employed in association with the air mixing valve disclosed in my aforementioned earlier filed copending application Ser. No. 438,570, filed Feb. 1, 1974. In this mixing valve, the respective first and second air inlet passages are positioned substantially in side-by-side relation and the valve means for controlling the flow of air through the respective passages comprises first and second groups of louvers pivotally mounted in the housing on spaced parallel axes for pivotal movement in the respective first and second passages. The first and second groups of louvers are operatively interconnected so that as one group of louvers moves toward an open position, the other group of louvers moves toward a closed position and vice versa. Further, the arrangement of the respective groups of louvers serves for directing the respective airstreams into converging relation with one another to effect thorough mixing thereof.

Some of the objects and advantages of the invention having been stated, others will appear as the description proceeds when taken in connection with the accompanying drawings, in which —

FIGS. 3 and 4 are sectional plan views through the mixing valve of FIG. 1, and showing the actuator and the louvers of the mixing valve in different respective positions of adjustment; and FIG. 5 is an elevation of the downstream side of the actuator, as viewed from the arrow 5 in FIG. 3.

Figure 1:
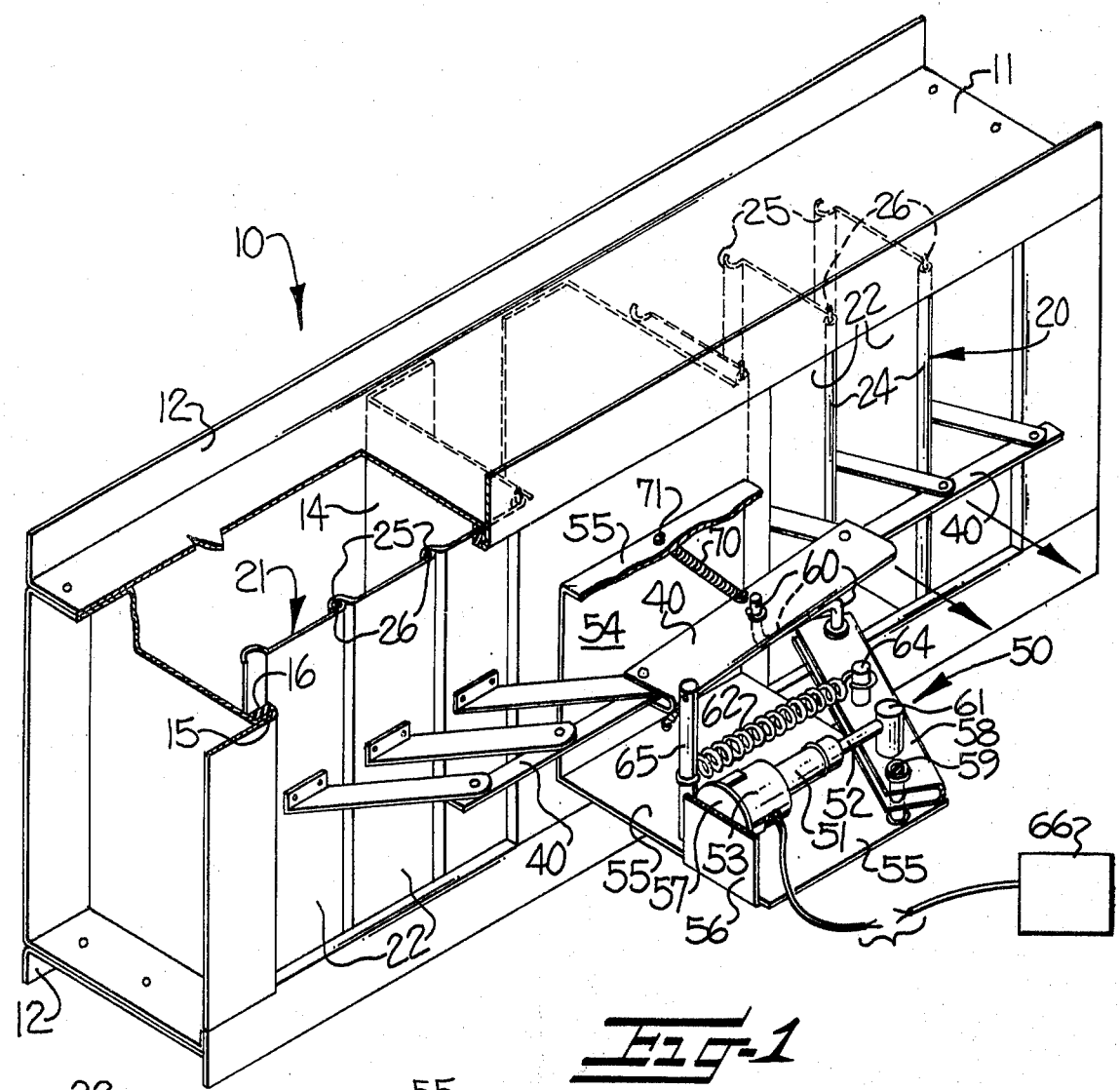
FIG. 1 is an isometric view of a mixing valve employing the improved type of actuator in accordance with this invention.

Referring more specifically to the drawings, it will be seen that the improved mixing valve, broadly designated at 10, is compact and substantially self-contained in that all essential components thereof are mounted on or in a relatively shallow and substantially rectangular housing or frame 11. The upstream or ingress end of frame 11 includes flange means 12 for facilitating suitable securement of the mixing valve in an air distributing system where two respective airstreams of different characteristics are being supplied to the mixing valve. For example, as disclosed in my aforementioned copending application Ser. No. 438,570, housing or frame 11 may be suitably installed within an outer housing of an air distributing unit with a pair of side-by-side air supply ducts communicating with the ingress or upstream end of housing 11.

The housing or frame 11 is so constructed as to provide first and second substantially side-by-side, relatively short and substantially parallel air passages 13, 14 therethrough which are aligned with the respective air supply ducts. Thus, the respective airstreams may flow through the first and second passages 13, 14 of mixing valve 10 when respective first and second flow control valves or louver means 20, 21 therein occupy partially or fully opened positions. As will be presently described, the first and second louver means 20, 21 are especially constructed, arranged and operated so that the airstreams flowing through passages 13, 14 of air mixing valve 10 are caused to converge when both louver means 20, 21 are open. Also, the louver means 20, 21 vary the volume of the airstreams with respect to each other. Thus, the airstreams rapidly and intimately mix with each other immediately upon emerging from the downstream ends of the respective air passages 13, 14 to form a composite airstream of the desired characteristics.

Generally, as is well known, an air mixing valve is utilized for the mixing of relatively warm and relatively cool airstreams to obtain a composite tempered airstream of the desired temperature. Accordingly, it may be assumed, for purposes of this disclosure, that the airstreams flowing through the respective passages 13, 14 are relatively warm and relatively cool, respectively.

As best illustrated in FIGS. 3 and 4, each of the first and second louver means 20, 21 comprises a plurality or group of substantially rectangular louver blades, each of which is designated at 22, and each of which is hinged or pivoted along or adjacent one longitudinal edge, as will be presently described. In the embodiment illustrated, each louver means 20, 21 is composed of a group of three louver blades 22. Each louver blade 22 preferably is formed of a relatively flat substantially rectangular and substantially rigid sheet metal, or any other suitable sheet material, and is provided with a hollow elongate rounded tubular portion 24 along one edge thereof. Each blade 22 is also provided with a substantially U-shaped lip portion 25 extending along the opposite longitudinal edge thereof, which lip portion constitutes the free edge of each louver blade in this instance.

Tubular portions 24 of louver blades 22 extend between opposite side walls of the respective passages 13, 14 defined by housing or frame 11. Opposite ends of the tubular portions 24 of blades 22 are suitably pivotally mounted on the corresponding opposite side walls of passages 13, 14, as by means of pivot pins 26 (FIG. 1). As shown, and as is preferred, the pivotally mounted tubular portions 24 of all of the louver blades 22 of both the first and second louver means 20, 21 are positioned in a row in spaced substantially parallel relation to each other closely adjacent the egress or downstream ends of the passages 13, 14. Also, at the egress or downstream ends of the respective rectangular passages 13, 14 the four side walls defining the perimeters of the passages 13, 14 are provided with inwardly projecting flange portions 15 (FIGS. 3 and 4) thereon for receiving against the rear surfaces thereof suitable resilient sealing means or gaskets 16. The gaskets 16 receive end edges of the body portions of the blades 22 in sealing engagement thereagainst whenever any of the blades 22 occupy fully closed position, as in the right-hand portion of FIG. 3.

The free longitudinal lip portion 25 of the outermost blade 22 of each louver means also is in sealing engagement with the corresponding portion of the respective gasket 16 when the latter louver blade 22 occupies a fully closed position. It is preferred that each gasket 16 be formed of an elastomeric sponge-like material, such as natural or artifical sponge rubber, to provide an effective seal against flow or leakage of air between the blades 22 of any closed louver means and the walls of the respective air passage. Such a seal is particularly desirable to avoid a whistling sound which might otherwise be produced by the leakage of pressurized air past a louver means occupying fully closed position.

The first and second louver means 20, 21 comprising the air control valve means of the mixing valve are operatively interconnected in a novel manner for movement relative to the egress openings of passages 13, 14 so that one louver means is moved toward an open position as the other louver means is moved toward a closed position, and vice versa. More particularly, the valve means includes an elongate operating member or connector arm 40 which may be of one piece construction or, as shown, may be of built-up articulated construction. In any event, operating member 40 is positioned outwardly and downstream of the egress ends or downstream openings of both of the first and second air passages 13, 14 in housing 11. Thus, operating member 40 is positioned to extend across and outwardly of the pivotal axes of the groups of louver blades 22 of both the first and second louver means 20, 21. A connector bar 44 is suitably secured or fixed to a central portion of each blade 22 adjacent the free longitudinal edge thereof, and the outer portion of each bar 44 is pivotally connected to operating member 40.

An actuator means, to be described presently, is operatively connected to the operating member 40 for imparting longitudinal movement thereto. It will be observed, by comparison of FIGS. 3 and 4, that since a pivotal motion is imparted to each connector bar 44 in the same general direction relative to operating member 40 during longitudinal movement thereof in a given direction, any time that operating member 40 is moved longitudinally in one direction, all of the louver blades 22 are pivoted in the same direction with respect to each other. However, the louver blades 22 of one louver means move toward an open position as the louver blades 22 of the other means move toward a closed position, and vice versa. In other words, whenever louver blades 22 of first louver means 20 are moved toward a closed position as a result of left to right movement of operating member 40 in FIGS. 3 and 4, louver blades 22 of second louver means 21 are moved toward an open position. Conversely, whenever blades 22 of second louver means 21 are moved toward a closed position as a result of right to left movement of operating member 40 in FIGS. 3 and 4, the louver blades 22 of first louver means 20 are moved toward an open position substantially as indicated in FIG. 3.

For the purposes of this disclosure, it may be assumed that, during optimum operating conditions, the blades 22 of the respective first and second louver means 20, 21 occupy predetermined intermediate positions about halfway between open and closed positions thereof, as indicated by the dashed lines of FIG. 3, with operating member 50 then occupying an intermediate position about halfway between opposite extremes of longitudinal movement. With the first and second louver means constructed and operated in the manner as disclosed herein, it is to be noted that, since each blade 22 is pivoted or hinged closely adjacent one of its longitudinal edges, when the blades of either louver means occupy the fully closed position as shown in FIGS. 3 and 4, substantially the entire surface of one side of each of such closed louver blades is then subjected to the full force or pressure of the airstream in the coresponding passage impinging against the closed louver blades. This aids in effecting a substantially airtight seal between the louver means and the side walls at the egress ends of the respective passages 13, 14. Also, such seal is further enhanced by the gasket 16 and the relative rigidity of the pivoted round tubular portions 24 of the blades 22 and the nesting sealing engagement of the lip portions 25 of certain of the blades along the pivotal axes of and adjacent tubular portions 24 of adjacent blades 22 when the respective louver means occupy a closed position.

Adjustment of the mixture of air obtained from the mixing valve is accomplished by an actuator means, generally indicated at 50, which cooperates with the respective louver means 20 and 21 to effect movement of the same. The actuator means employs as a prime mover a well-known temperature responsive thermal motor 51 or "power pill" of the type commonly employed in motor vehicle cooling systems and the like. Such thermal motor has a compact hollow housing or casing having sealed therein a temperature responsive filler material, such as wax or a mixture of wax and a material such as metal filings, which expands and contracts in response to variations in temperature. An axially movable shaft 52 extends from one end of the motor housing and is adapted to move from an axially retracted position to an axially extended position upon a predetermined increase in temperature of the thermal motor. Thermal motors of this type are well known and commercially available from the Fulton-Sylphon Division of Robertshaw Controls Company. Accordingly, a further detailed description of their structure and operation is not deemed necessary.

The actuator means also includes heating means positioned in heat transferring relation to the thermal motor 51 for applying heat thereto to effect movement of the motor shaft 52. As illustrated, the heating means comprises a heater 53 in the form of a coil of electrical resistance wire positioned surrounding the thermal motor housing for applying heat thereto upon application of electric current to the resistance wire. The resistance winding of heater 53 is connected to a conventional low voltage power source, such as a 24 volt thermostat circuit, and generates heat when energized so as to effect movement of the motor shaft 52 to an extended position. The watt density of heater 53 is sufficiently low that the heater may operate continuously for an indefinite period of time without overheating or burning out the resistance windings.

Figure 2:
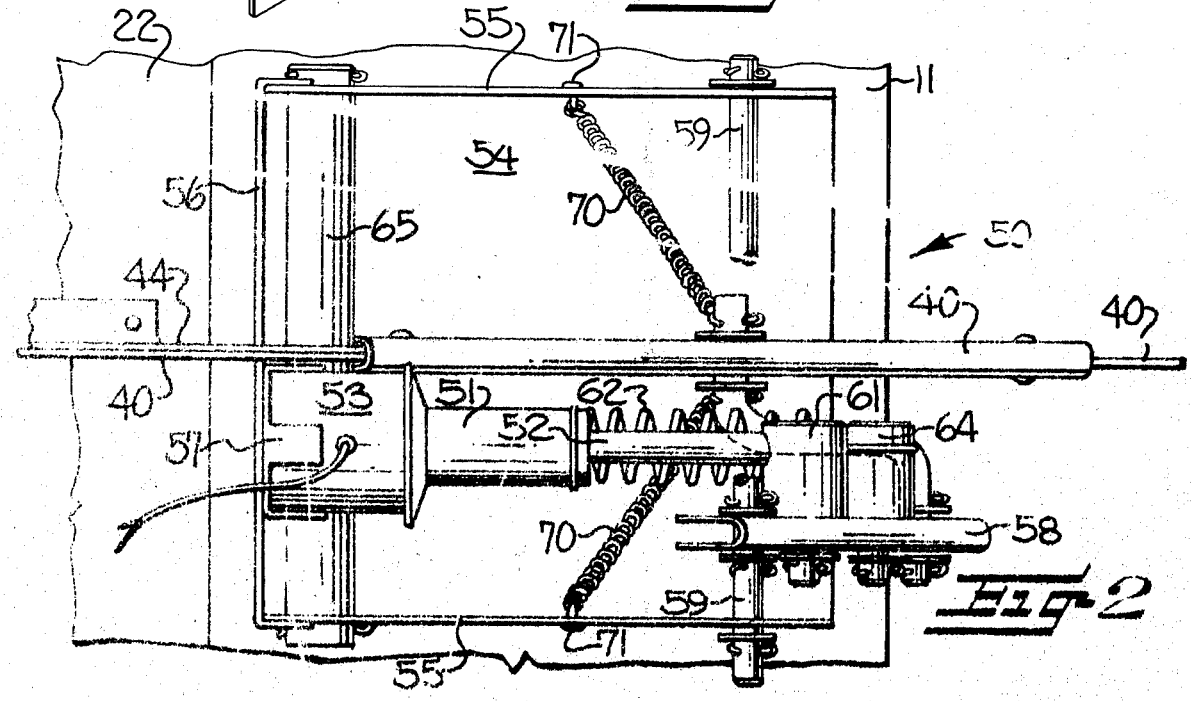
FIG. 2 is an enlarged elevational view of the downstream end of the actuator of FIG. 1, looking in the upstream direction.

As illustrated, the actuator means 50 is supported on a medial portion of the downstream side of housing 11 by a generally U-shaped support bracket 54 having a medial portion thereof suitably secured to housing 11 and having opposing leg portions 55 extending in the downstream direction. A bracket 56 (FIG. 2) is provided bridging one side of the opposing leg portions 55 near the respective downstream ends thereof and serves as a base for supporting thermal motor 51 thereon. The thermal motor 51 and heater 53 are suitably secured to bracket 56 by a mounting socket 57 (FIG. 2) carried by bracket 56 and having a plurality of short legs extending outwardly therefrom for grippingly engaging the outer surface of heater 53 to retain the heater and the thermal motor in place.

An elongate shiftable actuator member or rod 58 of generally U-shaped cross-section has one end thereof pivotally mounted to an outer end portion of support bracket 55 by suitable means, such as by pivot rod 59 which extends through opposing leg portions 55 of support bracket 54 and is suitably retained in place by cotter keys. The opposite free end of actuator rod 58 extends generally in the upstream direction toward housing 11 and is operably connected to the medial portion of movable operating member 40 by means of a generally Z-shaped connector rod 60. Thus it will be seen that pivotal movement of the actuator rod 58 is effective to move operating member 40 in a longitudinal direction to thereby adjust the position of the respective louver means 20 and 21.

As illustrated, the free end of motor shaft 52 is connected to actuator member or rod 58 by a suitable pivotable connector 61 at a location adjacent the pivotal axis of actuator member 58 as defined by pivot rod 59. Thus it will be seen that the interconnection by actuator member 58 of the thermal motor with the valve means defines a lever arrangement whereby a relatively short axial movement of motor shaft 52 will impart a considerably larger movement to the operating member 40 of the valve means. As illustrated, connector member 61 connects motor shaft 52 to the actuator member at a location about one-fifth the distance between pivot rod 59 and connector rod 60 so that the motion of motor shaft 52 is multiplied by a ratio of approximately 5 to 1. Since the thermal motor is extremely high powered for its size, sufficient force is available even at this high ratio for opening and closing the louver means against the force of the air pressure exerted thereon.

Also as illustrated, the actuator assembly includes means for biasing the actuator member or rod 58 toward a predetermined pivotal position when the actuator assembly is in the inactive or "at rest" position. This serves to position operating member 40 at the right extreme end of its longitudinal movement as viewed in FIG. 4 and to position louver means 21 in the fully open position while positioning louver means 20 in the fully closed position. As illustrated, this biasing of actuator rod 58 is accomplished by an elongate coil tension spring 62 having one end thereof suitably secured to a stationary support such as support bracket 54 and having the opposite end thereof secured to actuator rod 58 by a suitable connecting member 64. Referring more particularly to FIG. 1, it will be seen that the one end of spring 62 is connected to a stationary support rod 65 extending through opposing leg portions 55 of support bracket 54. When heater 53 is energized and shaft 52 of the thermal motor moves toward an extended axial position, the actuator rod 58 is pivotally moved against the biasing force exerted thereon by spring 62 to thereby effect opening of louver means 20 and closing of louver means 21. Thus, as indicated by the dashed lines of FIG. 3, when shaft 52 moves to an intermediate axial position, the respective louver means 20, 21 are each positioned about halfway open and, because of the orientation of the respective louver blades 22, serve to convergingly direct the two airstreams into intimate mixing relation with each other, as noted earlier. When thermal motor 51 is heated sufficiently to effect movement of shaft 52 to a fully extended axial position, the actuator means causes the respective louver means 20, 21 to be positioned as illustrated by the solid lines of FIG. 3, with louver means 20 in the fully open position and louver means 21 in the fully closed position. It will be readily understood that upon cooling of thermal motor 51 and movement of shaft 52 thereof toward a retracted position, louver means 20, 21 will again move through various intermediate positions and to the inactive or "at rest" position of FIG. 4.

The operation of heater 53 is governed by a suitable control device 66 (FIG. 1). In the most common application for a mixing valve where the valve is utilized for mixing relatively warm and relatively cool airstreams to obtain a composite airstream of a desired temperature, control device 66 would conventionally comprise a thermostat located remotely of the mixing valve for sensing the ambient temperature conditions in the room or zone being served by the air distributing system. In such an installation, the temperature of thermal motor 51, and thus the position of motor shaft 52, is varied depending upon the amount of time the heater 53 remains energized, as determined by the cycling of the thermostat under the ambient temperature conditions.

As noted earlier, each blade 22 of the respective louver means 20, 21 is pivoted or hinged closely adjacent one of its longitudinal edges, so that when the blades of either louver means occupy the fully closed position, substantially the entire surface of one side of each of such closed blades is subjected to the full force or pressure of the airstream in the corresponding passage, which, as previously noted, serves to maintain the closed blades in a closed position. In accordance with a preferred form of the invention, and as illustrated, means are provided for assisting the actuator means in overcoming the initial seal of the closed louver blades. This serves to reduce the amount of power required for moving the closed blades to an open position and also serves in obtaining more accurate control over the air mixture by reducing or preventing any "overshooting" movement which might otherwise occur with the louver blades once the initial seal of the closed louver blades is broken, particularly under conditions of relatively high static pressure in the supply ducts.

In accordance with this preferred form of the invention, force applying means is provided in response to movement of either louver means toward and into a closed position for exerting an opposing force thereon which biases the operating member 40 in the opposite direction from that in which it is being moved for aiding in subsequently moving the respective previously closed louver means in the opposite direction against the force of an airstream impinging thereon. In its preferred embodiment, the force applying means comprises a pair of coil tension springs 70 of relatively light weight as compared to spring 62, each having their proximal ends connected to opposite sides of operating member 40, and having their distal ends anchored to suitably located stationary points 71 on support bracket 54.

The stationary points 71 to which the distal ends of tension springs 70 are anchored are located at corresponding positions on leg portion 55 on opposite side of the operating member 40 so that the tension springs 70 substantially straddle the elongate operating member 40 when the same occupies the aforementioned neutral position thereof with the first and second louver means 20, 21 each in an equally open position. As operating member 40 is moved longitudinally out of its neutral position in either direction, springs 70 are stretched by operating member 40 to thereby exert an opposing force on operating member 40. In the illustrated and preferred embodiment, it can be seen that the proximal ends of the tension springs 70 are connected to a common point on opposite sides of operating member 40 about halfway between opposite ends of member 40. It is to be understood however, that other forms of spring means may be used in place of springs 70, the springs may be spaced apart along the length of operating member 40, or any other suitable means may be employed for exerting an opposing force on either louver means 20, 21 when it is moved toward and into closed position for aiding the actuator means 50 in subsequently opening the closed louver means against the pressure of an airstream impinging thereon.

It should be understood that in addition to providing a force which will assist the actuator in opening each respective fully closed louver means against the force of an airstream impinging thereon, the opposing force acting on each louver means 20, 21 when it is open only a very small amount aids in stabilizing the respective louver means in just that position, to the extent that it substantially prevents the respective blades 22 from fluttering or vibrating between the slightly opened and fully closed positions. This further aids in reducing the sound of the mixing valve and of the air flow therethrough during operation of the air distributing system.

While the actuator means 50 disclosed herein has been illustrated and described as being employed in association with a particular type of mixing valve, it will be appreciated by those knowledgeable in the art that the actuator means of the instant invention is well suited for use with various other types of mixing valves besides the type particularly illustrated.

In the drawings and specification, there has been set forth a preferred embodiment of the invention, and although specific terms are employed, they are used in a generic and descriptive sense only, and not for purposes of limitation.

That which is claimed is:

1. A mixing valve for mixing airstreams in an air distributing system, said mixing valve including a housing having substantially side-by-side first and second air inlet passages therein for receiving respective airstreams of different characteristics, valve means comprising first and second groups of louvers pivotally mounted in said housing on spaced parallel axes for pivotal movement in the respective first and second inlet passages for adjustably selecting the proportion of air received through the respective passages, means including an elongate longitudinally movable operating member operatively connected to said first and second groups of louvers, said operating member being longitudinally movable to and fro so as to move one group of louvers toward an open position while moving the other group of louvers toward a closed position and vice versa so as to obtain a mixture of the two airstreams from the mixing valve, and actuator means cooperating with said operating member for effecting adjustment of said groups of louvers to obtain a desired mixture of the different airstreams from the mixing valve, said actuator means including a thermal motor of the type comprising a compact sealed hollow casing containing a temperature responsive filler material therein and having an opening in one end of the casing with an axially movable shaft extending therefrom, electrical resistance heating means cooperating with the casing of said thermal motor for applying heat thereto to effect expansion of said filler material and movement of said motor shaft toward an extended axial position, and pivotally mounted lever means operatively connected to the axially movable shaft of said thermal motor and extending therefrom and operatively connecting the same to said valve means, the pivotal mounting of said lever means being positioned so as to amplify the axial movement of said motor shaft into a much larger adjustment of said valve means for thereby effecting said adjustment of the proportion of air received through the respective air inlet passageways.

2. A mixing valve according to claim 1 wherein said pivotally mounted lever means operatively connected to said thermal motor and to said valve means includes a shiftable rod movable through a predetermined stroke of movement between first and second predetermined positions in response to the axial movement of said motor shaft for thereby effecting adjustment of said valve means through a predetermined range of adjustment.

3. A mixing valve according to claim 2 wherein said shiftable rod is mounted at one location along its length for pivotal movement relative to said housing, and wherein said thermal motor is operatively connected to said shiftable rod at a location closer to the pivot point than the operative connection of said valve means to said shiftable rod whereby a relatively small axial movement of said motor shaft imparts a relatively large movement to said valve means.

4. A mixing valve according to claim 1 wherein said actuator means includes biasing means for biasing said valve means toward a first predetermined adjusted position, and wherein said thermal motor cooperates with said valve means so as to move the same against said biasing means and toward a second predetermined adjusted position in response to heat being applied to the thermal motor by said heating means.

5. A mixing valve according to claim 1 wherein said first and second groups of louvers are oriented toward one another so as to convergingly direct the respective airstreams flowing therethrough into mixing relation with one another.

6. A mixing valve for mixing airstreams in an air distributing system, said mixing valve including a housing having substantially side-by-side first and second air inlet passages therein for receiving respective warm and cool airstreams, valve means comprising first and second groups of louvers pivotally mounted in said housing on spaced parallel axes for pivotal movement in the respective first and second passages, means including an elongate longitudinally movable operating member operatively connected to said first and second groups of louvers, said operating member being movable to and fro longitudinally thereof so as to move one group of louvers toward an open position while moving the other group of louvers toward a closed position and vice versa so as to permit obtaining a desired mixture of the warm and cool airstreams from the mixing valve, and actuator means positioned downstream of and between said first and second air inlet passages and operatively connected to said operating member for imparting longitudinal movement thereto and being responsive to a demand for an increased or decreased temperature of air from the mixing valve for effecting adjustment of the temperature of the air mixture from the mixing valve, said actuator means including a thermal motor of the type comprising a compact sealed hollow casing containing a temperature responsive filler material therein and having an opening in one end of the casing with an axially movable shaft extending therefrom, thermostat means, electrical resistance heating means cooperating with the casing of said thermal motor and with said thermostat means and being responsive to the thermostat means for applying heat to said thermal motor to effect movement to said motor shaft toward an extended axial position, and means cooperating with said thermal motor and operatively connecting the same to said longitudinally movable operating member for imparting a relatively large longitudinal movement thereto in response to a relatively small axial movement of said motor shaft.

7. A mixing valve according to claim 6 wherein said means operatively connecting said thermal motor to said operating member includes a shiftable rod movable through a predetermined stroke of movement between first and second predetermined positions for effecting adjustment of said first and second groups of louvers through a predetermined range of adjustment, and wherein said actuator means also includes means cooperating with said shiftable rod for biasing the same toward said first predetermined position, and wherein said thermal motor cooperates with said shiftable rod so as to move the same against said biasing means toward said second predetermined position upon heat being applied to the thermal motor by said heating means.

8. A mixing valve for mixing airstreams in an air distributing system, said mixing valve including a housing having substantially side-by-side first and second air inlet passages therein for receiving respective airstreams of different characteristics, valve means comprising first and second groups of elongate louver blades pivotally mounted along one longitudinal edge portion in said housing on spaced parallel axes for pivotal movement in the respective first and second passages, means including an elongate longitudinally movable operating member operatively connected to said first and second groups of louver blades, said operating member being movable to and fro longitudinally thereof so as to move one group of louver blades toward an open position while moving the other group of louver blades toward a closed position and vice versa so as to obtain a mixture of the two airstreams from the mixing valve, and actuator means operatively connected to said operating member for imparting longitudinal movement thereto for effecting adjustment of the air mixture from the mixing valve, said actuator means including a thermal motor of the type comprising a compact sealed hollow casing containing a temperature responsive filler material therein and having an opening in one end of the casing with an axially movable shaft extending therefrom, electrical resistance heating means cooperating with the casing of said thermal motor for applying heat to said thermal motor to effect expansion of said filler material and movement to said motor shaft toward an extended axial position, and means cooperating with said thermal motor and operatively connecting the same to said longitudinally movable operating member for imparting a relatively large longitudinal movement thereto in response to a relatively small axial movement of said motor shaft.

* * * * *